(12) United States Patent
Wang et al.

(10) Patent No.: US 10,388,935 B2
(45) Date of Patent: Aug. 20, 2019

(54) ELECTRODE TAB STRUCTURE AND BATTERY

(71) Applicant: Dongguan Amperex Technology Limited, Dongguan (CN)

(72) Inventors: Kefei Wang, Dongguan (CN); Liangzhen Xiao, Dongguan (CN); Qiao Zeng, Dongguan (CN); Qingfeng Yuan, Dongguan (CN); Jibin Geng, Dongguan (CN)

(73) Assignee: DONGGUAN AMPEREX TECHNOLOGY LIMITED, Dongguan (CN)

( * ) Notice: Subject to any disclaimer, the term of this patent is extended or adjusted under 35 U.S.C. 154(b) by 72 days.

(21) Appl. No.: 15/590,246

(22) Filed: May 9, 2017

(65) Prior Publication Data
US 2018/0083254 A1    Mar. 22, 2018

(30) Foreign Application Priority Data

Sep. 21, 2016    (CN) .................... 2016 2 1072665 U

(51) Int. Cl.
*H01M 2/26*    (2006.01)
*H01M 2/20*    (2006.01)
(Continued)

(52) U.S. Cl.
CPC .............. *H01M 2/266* (2013.01); *H01M 2/20* (2013.01); *H01M 2/26* (2013.01); *H01M 2/30* (2013.01); *H01M 4/00* (2013.01); *H01M 10/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 2011/0052971 A1* | 3/2011 | Fujikawa | ................ | H01M 2/22 429/161 |
| 2013/0101884 A1* | 4/2013 | Ueda | ................... | H01M 10/052 429/127 |
| 2013/0295444 A1* | 11/2013 | Kim | ....................... | H01M 2/266 429/179 |

FOREIGN PATENT DOCUMENTS

| | | | | |
|---|---|---|---|---|
| JP | 10302755 A | * | 11/1998 | |
| JP | 11040147 A | * | 2/1999 | |
| JP | 2012113995 A | * | 6/2012 | .............. H01M 2/26 |

OTHER PUBLICATIONS

J-PlatPat machine translation of the detailed description of JP 10-302755A (Nov. 1998). (Year: 1998).*

* cited by examiner

*Primary Examiner* — Gregg Cantelmo
(74) *Attorney, Agent, or Firm* — Tucker Ellis LLP

(57) ABSTRACT

The present application provides an electrode tab structure and a battery, the electrode tab structure includes: an electrode tab substrate; a current collector connected with the electrode tab substrate, a largest thickness after the electrode tab substrate being welded with the current collector is less than or equal to 1.5 times of a sum of a thickness of the electrode tab substrate and a thickness of the current collector. In the present application, the thickness of the electrode tab structure is suitably limited with respect to the sum of the thickness of the electrode tab substrate and the current collector, which avoids defect of too large welding resistance caused by too large thickness of the electrode tab structure, so as to improve internal symmetry of the cell, increase the reliability of the electrode tab structure, and avoid from deforming, which thereby improving the overall performance of the battery.

8 Claims, 2 Drawing Sheets

(51) Int. Cl.
*H01M 4/00* (2006.01)
*H01M 10/04* (2006.01)
*H01M 2/30* (2006.01)

ELECTRODE TAB STRUCTURE AND BATTERY

CROSS-REFERENCE TO RELATED APPLICATIONS

The present application claims priority to Chinese Patent Application No. 201621072665.4, filed on Sep. 21, 2016, the content of which is incorporated herein by reference in its entirety.

TECHNICAL FIELD

The present application relates to the technical field of batteries and, particularly, relates to an electrode tab structure and a battery.

BACKGROUND

Electrode tab structure is closely related to cell performance of a battery. At present, in the electrode tab structure of the prior art, the situation that the welding thickness is too large frequently occurs. However, the too large welding thickness will easily cause too large welding resistance, which influences performance of the electrode tab structure and even the overall battery performance.

Therefore, how to prevent the battery performance from being influenced by the too large welding thickness has become an urgent problem to be solved at present.

SUMMARY

The present application provides an electrode tab structure and a battery, so as to solve the problem in the prior art that battery performance from is influenced by too large welding thickness.

In a first aspect, embodiments of the present application provide an electrode tab structure, including: an electrode tab substrate; a current collector connected with the electrode tab substrate, a largest thickness of the electrode tab substrate after being welded with the current collector is less than or equal to 1.5 times of a sum of a thickness of the electrode tab substrate and a thickness of the current collector.

Preferably, at least one electrode tab substrate is provided, each electrode tab substrate is connected with the current collector.

Preferably, the electrode tab substrate includes: a welding region having a plurality of welding spots, the welding region is connected with the current collector through the plurality of welding spots, the sum of the thickness of the electrode tab substrate and the thickness of the current collector is larger than or equal to 10 μm, and is less than or equal to 250 μm.

Preferably, a welding area of each welding spot of the plurality of welding spots is less than or equal to 1 mm².

Preferably, a number of the welding spot per square millimeter of the welding region is larger than or equal to 1.

Preferably, a total welding area of the plurality of welding spots is less than or equal to 70% of an area of the welding region.

Preferably, the plurality of welding spots are defined in a line-row layout or a circular layout.

Preferably, the electrode tab substrate also includes: an unwelded region connected with the welding region, an end of the unwelded region is shaped as an arc.

In a second aspect, embodiments of the present application provide a battery, at least one electrode tab of the battery includes any one of the electrode tab structures shown in above technique solutions.

Preferably, the battery has a jelly roll, a stacking cell or a hybrid of jelly roll and stacking cell.

In the present application, in order to solve the problem in the prior art that battery performance from is influenced by too large welding thickness, the above solution limits the thickness of the electrode tab structure, that is, limits the largest thickness after the electrode tab substrate being welded with the current collector to be less than or equal to 1.5 times of the sum of the thickness of the electrode tab substrate and the current collector, so that the thickness of the electrode tab is suitable, which avoids defect of the too large welding resistance caused by too large thickness of the electrode tab structure, so as to improve internal symmetry of the cell, increase the reliability of the electrode tab structure, thereby avoid from deforming, and improve the overall performance of the battery.

in which, correspondence between names of components in FIG. 1, FIG. 2 and FIG. 4 and reference signs is shown as follows:

Electrode tab structure—1, Electrode tab substrate—11, Welding region—111, Welding spot—1111, Unwelded region—112, End 1121, Current collector—12.

DESCRIPTION OF EMBODIMENTS

In order to better understand technical solutions of the present application, the present application will be described in detail with reference to the drawings.

It should be noted that, the embodiments described are only a part of the embodiments of the present application, rather than all of the embodiments. Based on the embodiments in the present application, all other embodiments obtained by those skilled in the art without creative work are belonging to the protection scope of the present application.

Figure 1:
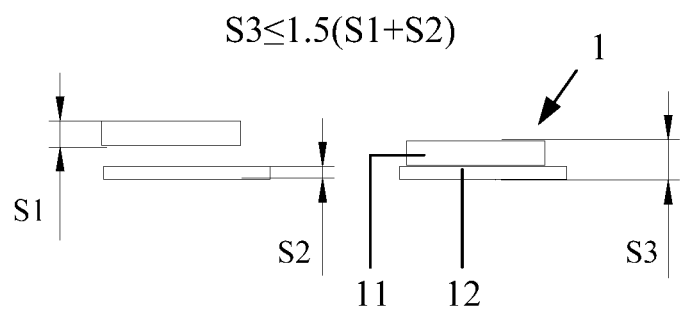
FIG. 1 is a schematic diagram of an electrode tab structure according to an embodiment of the present application.

FIG. 1 is a schematic diagram of an electrode tab structure according to an embodiment of the present application.

As shown in FIG. 1, an electrode tab structure 1 includes an electrode tab substrate 11 and a current collector 12, the current collector 12 is connected with the electrode tab substrate 11, the thickness of the electrode tab substrate 11 is S1, the thickness of the current collector 12 is S2, the largest thickness S3 (including welding imprint) after the electrode tab substrate 11 being welded with the current collector 12 is less than or equal to 1.5 times of the sum of thickness of the electrode tab substrate 11 and the current collector 12.

For example, an aluminum strip electrode tab of 80 μm and an aluminum foil current collector of 14 μm can be adopted for welding experiment, three welding pedestals and two welding heads are adopted for experiments, and the experimental content is shown in Table 1.

TABLE 1

| | Welding pedestal | Welding head | Welding thickness (μm) | Welding tension (N) | Welding resistance (mΩ) |
|---|---|---|---|---|---|
| Embodiment 1 | Zigzag welding pedestal | Coarse texture welding head | 141 | 18.49 | 105 |
| Embodiment 2 | Zigzag welding pedestal | Fine texture welding head | 139 | 22.22 | 103 |
| Embodiment 3 | Ceramic welding pedestal | Coarse texture welding head | 125 | 34.9 | 100 |
| Embodiment 4 | Ceramic welding pedestal | Fine texture welding head | 118 | 33.19 | 98 |
| Embodiment 5 | Corroded welding pedestal | Coarse texture welding head | 135 | 28.07 | 100 |
| Embodiment 6 | Corroded welding pedestal | Fine texture welding head | 138 | 29.23 | 99 |

Through the experiments, it is found that the combination of the ceramic welding head and the fine texture welding head performs better. The welding effect of the ceramic welding pedestal is better than the corroded welding pedestal, the welding effect of the zigzag welding pedestal is poor. For the corroded welding pedestal, the welding effect of the coarse texture welding head is better than the fine texture welding head, which may due to the structure of the corroded welding pedestal. For other welding pedestals, the welding effect of the fine texture welding head is better than the coarse texture welding head. A better welding effect can be obtained through optimizing the welding pedestal and welding head, and through controlling the number and size of the welding spot.

Besides, the value of times that the largest thickness S3 after the electrode tab substrate 11 being welded with the current collector 12 is less than or equal to sum of the thickness of the electrode tab substrate 11 and the current collector 12 can be otherwise selected according to actual needs.

In the above embodiment, there is at least one electrode tab substrate 11, each electrode tab substrate 11 is connected with the current collector 12.

In order to solve the problem in prior art that the battery performance is influenced by too large welding thickness, the above solution limits the thickness of the electrode tab structure, i.e. the largest thickness after the electrode tab substrate being welded with the current collector, to be less than or equal to 1.5 times of the sum of the thickness of the electrode tab substrate and the current collector, so that the thickness of the electrode tab structure is suitable, which avoids defects of too large welding resistance caused by too large thickness of the electrode tab structure, and improves internal symmetry of the cell, increases the reliability of the electrode tab structure, so as to avoid from deforming, and improve the overall performance of the battery.

Figure 2:
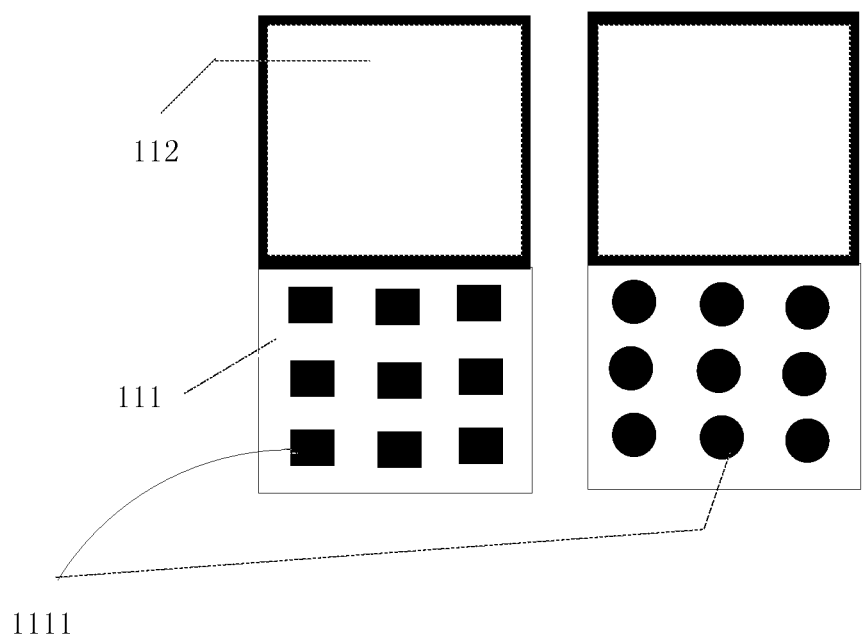
FIG. 2 is a schematic diagram of an electrode tab substrate of the electrode tab structure shown in FIG. 1 after being welded.

FIG. 2 is a schematic diagram of an electrode tab substrate of the electrode tab structure shown in FIG. 1 after being welded.

As shown in FIG. 2, the electrode tab substrate 11 includes a welding region 111, the welding region 111 has a plurality of welding spots 1111. Therefore, the welding region 111 is connected with the current collector 12 through the plurality of welding spots 1111, the sum of the thickness of the electrode tab substrate 11 and the current collector 12 is larger than or equal to 10 μm, and is less than or equal to 250 μm.

In the above embodiment, the sum of the thickness of the welding area 111 and the current collector 12 is preferably larger than or equal to 10 μm, and is less than or equal to 250 μm. Absolutely, other thickness ranges can also be selected according to actual needs.

Through limiting the sum of the thickness of the electrode tab substrate and the current collector within a certain range, that is, limiting the largest thickness after welding within a certain range, problems such as too large welding resistance, insufficient welding and the like caused by too large thickness after welding can be avoided, which thereby improving electrode tab structure and battery performance.

Moreover, since the largest thickness of the electrode tab structure of two battery electrodes after welding is limited, symmetry of the cell internal structure of battery can be guaranteed, so as to avoid cell deforming and insufficient welding.

In the above embodiment, there is at least one welding spot 1111, the welding area of each welding spot is less than or equal to 1 square millimeter.

The welding area of each welding spot can be less than or equal to 1 square millimeter. Absolutely, other values can also be selected according to actual needs.

Through limiting the welding area of each welding spot, the current collector can avoid from being fused by too large area of a single welding spot, so as to improve reliability of the electrode tab structure.

Besides, shape of the welding spot includes, but is not limited to, polygon, circle or oval.

In the above embodiment, there is at least one welding spot 1111 in each square millimeter of the welding region 111.

For a compact battery, each unit area can be a square millimeter, besides, when the unit area is selected to be a square millimeter, the number of the welding spot 1111 in each square millimeter area is larger than or equal to 1. Absolutely, values of the number of the welding spot 1111 in each square millimeter area other than the above value can also be selected according to actual needs.

Through limiting the number of welding spots, the current collector can avoid from being fused caused by too many welding spots, so as to improve reliability of the electrode tab structure.

In the above embodiment, the total welding area of the welding spot 1111 is less than or equal to 70% of the area of the welding region 111.

The percentage is preferably 70%. Absolutely, other percentage can also be selected according to actual needs.

Through limiting the total welding area, the current collector can avoid from being fused caused by too large total welding area, so as to improve reliability of the electrode tab structure.

In conclusion, too large welding area can cause poor welding effect due to uneven surface of the welding head, and partial region is not connected well, which will cause problems such as large welding resistance, fusing of the current collector and the like. If the number of the welding spot per square millimeter of the welding region of the electrode tab substrate is larger than or equal to 1 in average, it can be avoided that the number of the welding spot is too less. In general, either too large welding spot, too large empty welding region or too small number of the welding spot will be adverse to the welding resistance.

In the above embodiment, the welding spot 1111 presents a line-row layout or a circular layout.

The welding spot 1111 presents a regular layout, which can make the electrode tab substrate welding the current collector more reliable, the layout manner includes but is not limited by line-row layout or circular layout.

In the above embodiment, the battery can adopt a jelly roll, a stacking cell or a hybrid of jelly roll and stacking cell.

Figure 3:
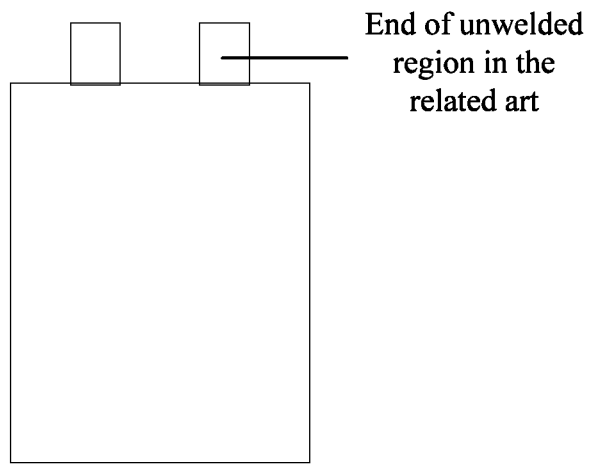
FIG. 3 is a schematic diagram of an end of an unwelded region in the prior art.

As shown in FIG. 3, in the prior art, an end of the unwelded region is generally sharp, which is easy to scratch other cells or the operator.

Figure 4:
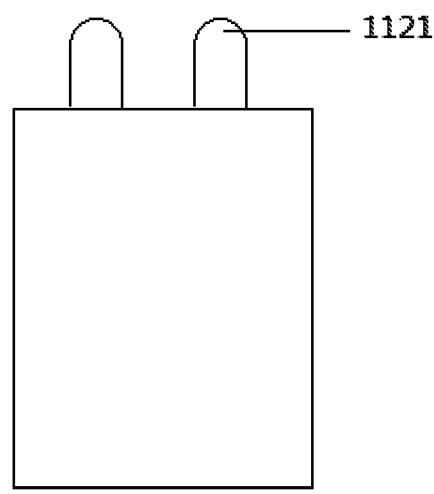
FIG. 4 is a schematic diagram of an end of an unwelded region of the electrode tab structure shown in FIG. 1.

In order to solve the above problem, as shown in FIG. 4, the unwelded region 112 of the electrode tab substrate 11 is connected with the welding region 111, the end 1121 of the unwelded region 112 is shaped as an arc, that is, a circle or an oval, so as to avoid from scratching other cells or the operator.

Besides, the embodiments of the present application also provides a battery, at least one electrode tab of the battery includes the said electrode tab structure 1 in any one of the above technique solutions, therefore, the battery has the same technique effect of the said electrode tab structure 1 in any one of the above technique solution, which will not be repeated here.

The technique solutions of the present application have been described in detail with reference to the drawings, in the technique solution of the present application, through limiting the largest thickness of the electrode tab structure after welding to be less than or equal to 1.5 times of the sum of the thickness of the electrode tab substrate and the current collector makes the thickness of the electrode tab suitable, which avoids defect of the too large welding resistance caused by too large thickness of the electrode tab structure, so as to improve the internal structure symmetry of the cell, increase the reliability of the electrode tab structure, and avoid from deforming, which improves the overall performance of the battery. Generally, for the positive electrode, an aluminum foil is selected as the current collector, an aluminum strip as the electrode tab; for the cathode electrode, a copper foil is adopted as the current collector, nickel, nickel-plated copper, copper strip is adopted as the electrode tab, the material of the current collector and the electrode tab is not limited, other materials can also be adopted.

The above are merely the preferred embodiments of the present application, which will not limit the present application, for those skilled in the art, the present application can have various modifications and variations. Any modifications, equivalent replacements and improvements made within the spirits and principles of the present application shall fall in the protection scope of the present application.

The terms used in the embodiments of the present application is only used for the objective of describing certain embodiment, which is not intended to limit the present application. The singular form of 'a/an', 'said' and 'the' used in the embodiments of the present application and the claims also include plural forms, unless other meanings according to the context are clearly indicated.

What is claimed is:

1. An electrode tab structure, comprising:
an electrode tab substrate; and
a current collector, wherein the current collector is welded with the electrode tab substrate to form a tab structure, and the tab structure has a thickness greater than or equal to 1.25 times a sum of a thickness of the electrode tab substrate and a thickness of the current collector, and smaller than or equal to 1.5 times the sum of the thickness of the electrode tab substrate and the thickness of the current collector,
a welding region having a plurality of welding spots, the welding region being connected with the current collector through the plurality of welding spots,
wherein a welding area of each welding spot of the plurality of welding spots is less than 1 mm$^2$, and
a number of welding spots per square millimeter of the welding region is larger than 1.

2. The electrode tab structure according to claim 1, wherein at least one electrode tab substrate is provided, each electrode tab substrate is connected with the current collector.

3. The electrode tab structure according to claim 1, wherein
the sum of the thickness of the electrode tab substrate and the thickness of the current collector is larger than or equal to 10 μm, and is less than or equal to 250 μm.

4. The electrode tab structure according to claim 1, wherein a total welding area of the plurality of welding spots is less than or equal to 70% of an area of the welding region.

5. The electrode tab structure according to claim 1, wherein the plurality of welding spots are defined in a line-row layout or a circular layout.

6. The electrode tab structure according to claim 3, wherein the electrode tab substrate further comprises:
an unwelded region connected with the welding region, an end of the unwelded region is shaped as an arc.

7. A battery, wherein at least one electrode tab of the battery comprises the electrode tab structure according to claim 1.

8. The battery according to claim 7, wherein the battery has a jelly roll, a stacking cell or a hybrid of jelly roll and stacking cell.

* * * * *